Figure 1:
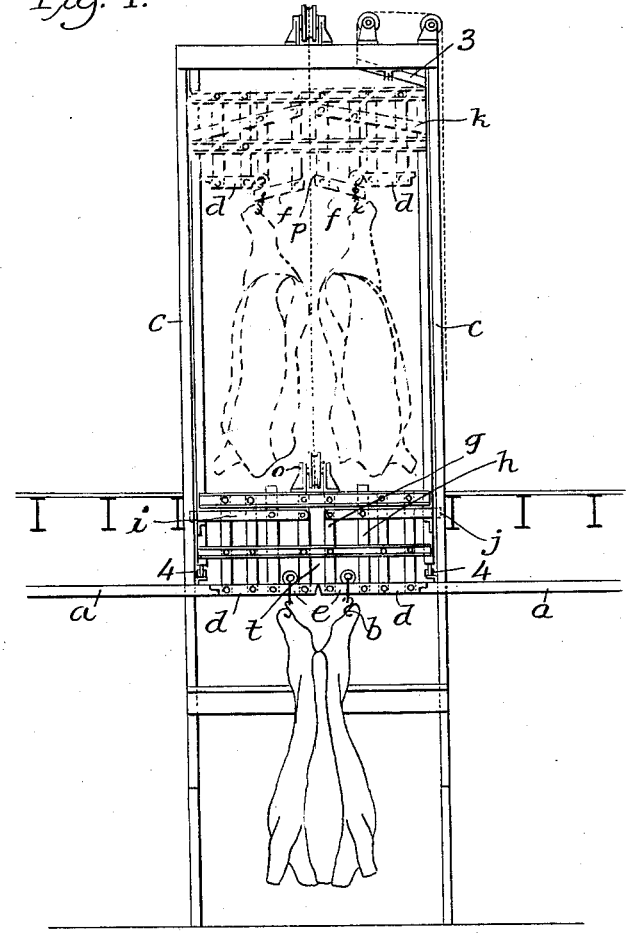

April 26, 1932.  J. FAGONDE  1,855,391

CARCASS CUTTING DEVICE

Filed May 15, 1929   2 Sheets-Sheet 1

INVENTOR:
Julian Fagonde
BY
ATTORNEY.

INVENTOR:
Julian Fagonde
BY
ATTORNEY.

Patented Apr. 26, 1932

1,855,391

UNITED STATES PATENT OFFICE

JULIAN FAGONDE, OF BANFIELD, ARGENTINA

CARCASS CUTTING DEVICE

Application filed May 15, 1929, Serial No. 363,166, and in Argentina November 23, 1928.

The present invention relates to a new device for cutting or sawing carcasses in half, which operation is carried on principally in slaughter-houses and meat-freezing factories.

The essential feature of the present invention resides in the fact that the saw or cutting member is stationary, while the carcass is advanced in contact with the saw-blade, which feature distinguishes the present invention from all other devices actually in use or heretofore known and in which the carcass is stationary while the saw or cutting elements advances as the cutting operation proceeds.

In order that the present invention may be clearly understood and readily carried into practice, the same has been illustrated on the accompanying drawings showing three different views. These drawings and explanations refer exclusively to the basic devices and parts necessary, without specifying constructional details which may be quite numerous through application of known mechanical elements.

In the drawings:—

Figure 2:
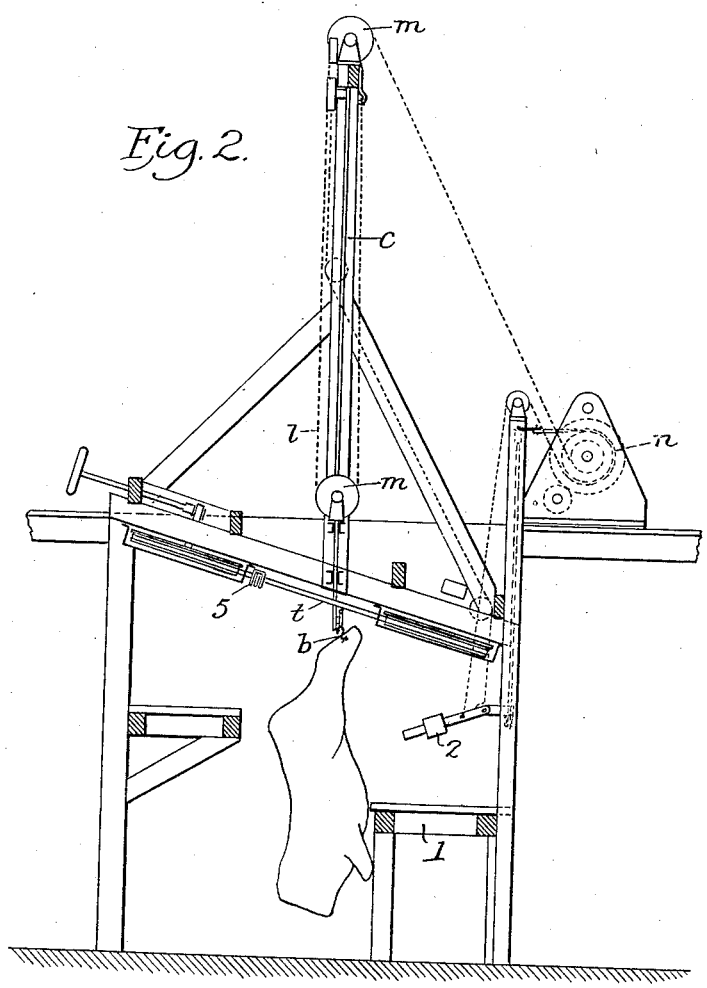
Figure 3:
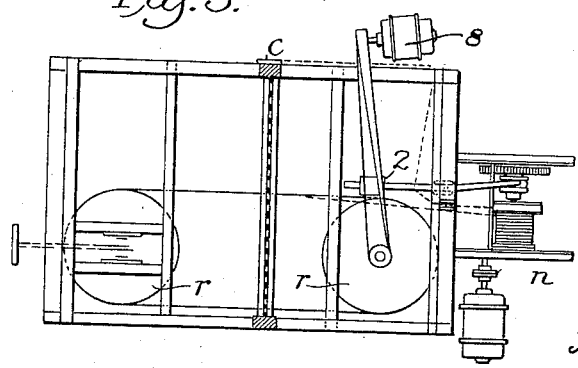

Fig. 1 is a front elevation of the device;
Fig. 2 is a side elevation thereof; and
Fig. 3 is a plan view.

In all these figures, the same numbers or characters denote like parts throughout.

It is understood that the showing of the drawings offers merely one example of carrying the invention into practice since the invention is not limited thereto but may be applied to any other construction employing a saw or fixed cutting member and wherein the carcass is advanced in the direction of the saw as the cutting proceeds.

Fig. 1 of the drawings shows in front elevation a plant for sawing or cutting carcasses wherein the carcasses are fed by means of the rail $a$ and supported with the rear legs from sheaves $b$, until the carcass assumes a position centrally of the lift formed by two main uprights $c$ and a system of tackle, winch, etc.

The continuous rail $a$ is cut off when entering the lift but is branched to a special rail constructed of four like sections in pairs, that is to say, the two sections $d$ at either side of the lift serve for connection with rail $a$, and the central sections $e$ which, by means of a linked lever system once the lift has travelled upwards of approximately 20 cms., assume the angular position $f$ as shown in the upper portion of Fig. 1.

This sloped position is attained because the rail $e$ is connected by means of bolts to the fixed bar $g$ forming a part of the bridge of the lift, and to the movable bar $h$, which latter bar is secured to the lever $i$ secured with one end to the fixed bar $g$ and imbedded with its other end in an orifice $j$ provided at the upright $c$.

When the motor and winch $n$ are started, the bridge of the lift is drawn upwards by means of the cable L and pulleys $m$ when the bar $i$ slopes rotating about the bolt $o$ connecting the latter to the fixed bar $g$ until its free end emerges from the orifice $j$ assuming the position shown at $k$.

With the angular movement of the bar $i$, such movement is transmitted to the rail portion $e$ which remains inclined as at $f$ thus causing the pulleys or sheaves to assume a counterbalancing position.

Simultaneously with the sloping movement of both rail portions $e$, they leave within them a central opening $p$ so that the lift, in its upward movement, provides for the necessary clearance in order to avoid having the rails $e$ enter in contact with the endless saw $t$ mounted with its motor $q$ and wheels $r$ transversely of the rail $a$ and inclined as shown in Fig. 2.

Assuming a carcass disposed at the center of the lift, the sole operator who is standing on the bridge 1, by means of the lever 2 starts movement of the winch $n$ whereby the lift bridge will move upwards, and the rail thereof assumes the position shown at the upper part of Fig. 1.

As the carcass is moving upwards the endless saw will cut or divide it through the dorsal spine, to which end the operator will guide the carcass in its upward travel in order that the saw may effect a correct cut.

Once the cutting operation terminates, the carcass divides into two pieces at its uppermost position, when the operator will stop the movement of the winch n, or this may take place automatically, lowering again the bridge to its lower or initial position, so as to cause the two halves of the carcass to be carried away on rail a when the bridge is ready for receiving a further carcass to be subjected to the cutting operation.

The inclined arrangement of the saw is of importance and necessary in order to maintain the blade of the saw, at any moment, in contact with two vertebrae, thus ensuring a more perfect cut.

There are provided safety devices such as: a device 3, Fig. 1 in order to stop the upward movement of the lift; a damping device 4, Fig. 1, in order to avoid blows when the lift is lowered; the device 5, Fig. 2 to keep the blade of the saw clean, and further devices which are of no importance in the present case.

Evidently, besides the principle, there may be made any kind of modifications of construction and detail without departing from the sphere of the present invention clearly defined by that constituting its principle and in the appended claims.

Having thus fully described and ascertained the nature of my said invention and the manner in which the same is to be performed and carried into practice, I declare that what I claim as of my exclusive invention and proprietorship is:—

1. A device for cutting carcasses, comprising a frame; a rail device movable in the frame on which the carcass is placed; a cutter operatively mounted in said frame in a plane at an angle to the horizontal and passing through the rail device; and means for elevating a portion of the rail device supporting the carcass to raise the carcass up to and past the cutter; said rail device including connected sections positioned to engage and cooperate with the frame when in a lower supporting position to form a rail or continuous support and so constructed and arranged as to collapse and spread apart upon being raised and disengaged from the frame, whereby certain of the sections will straddle the cutter during their movement past the cutter.

2. A device for cutting carcasses, comprising a frame; a rail device movable in the frame on which the carcass is placed; a cutter operatively mounted in said frame in a plane at an angle to the horizontal, said rail device having members arranged to permit the passage of the cutter therethrough; and means for elevating a portion of the rail device supporting the carcass to raise the carcass up to and past the cutter; certain of said members of said rail device positioned to engage and cooperate with the frame when in a lower supporting position to form a rail or continuous support and so constructed and arranged as to collapse and spread apart upon being raised and disengaged from the frame, whereby certain of the sections will straddle the cutter during their movement past the cutter.

3. A device for cutting carcasses, including a frame; a rail device movable in the frame on which the carcass is placed; means for raising the rail device in the frame; and a cutter passing through the rail device for cutting the carcass; said rail device comprising connected sections positioned to engage and cooperate with the frame when in a lower supporting position to form a rail or continuous support and having certain of said sections pivotally mounted to permit spreading of the pivoted sections upon being raised and disengaged from the frame, to allow the rail device to pass the cutter upon being raised.

In testimony whereof I affix my signature.
JULIAN FAGONDE.